Sept. 5, 1972  R. PETIT ET AL  3,689,212
METHOD OF PURIFYING GASEOUS MIXTURES
Filed Dec. 22, 1969  2 Sheets-Sheet 1

Inventors
Roland Petit
Jean Louise
Jean Claude Parent
Leon Hay

By Broudy and Neimark
Attorneys

United States Patent Office
3,689,212
Patented Sept. 5, 1972

3,689,212
METHOD OF PURIFYING GASEOUS MIXTURES
Roland Petit, Denain, Jean Louise, Villejuif, Jean-Claude Parent, La Garenne, and Leon Hay, Paris, France, assignors to L'Air Liquide, Societe Anonyme pour l'Etude et l'Exploitation des Procedes Georges Claude, Paris, France
Filed Dec. 22, 1969, Ser. No. 887,240
Claims priority, application France, Dec. 27, 1968, 180,879
Int. Cl. B01d 53/16, 53/34
U.S. Cl. 423—239
18 Claims

ABSTRACT OF THE DISCLOSURE

Process for purifying $N_2O$, containing various impurities, such as NO, $NO_2$, $N_2O_4$, $NH_3$, $H_2O$, etc. wherein the gas mixture undergoes at least one preliminary treatment with a view to eliminating the impurities, such as $NO_2$, $N_2O_4$, $NH_3$, $H_2O$, etc. and then it is purified, particularly to remove traces of residual NO, by means of an adsorbent mass which is formed of a molecular sieve such as natural, artificial or synthetic zeolite, charged with a metal in the metallic form.

---

Figure 1:
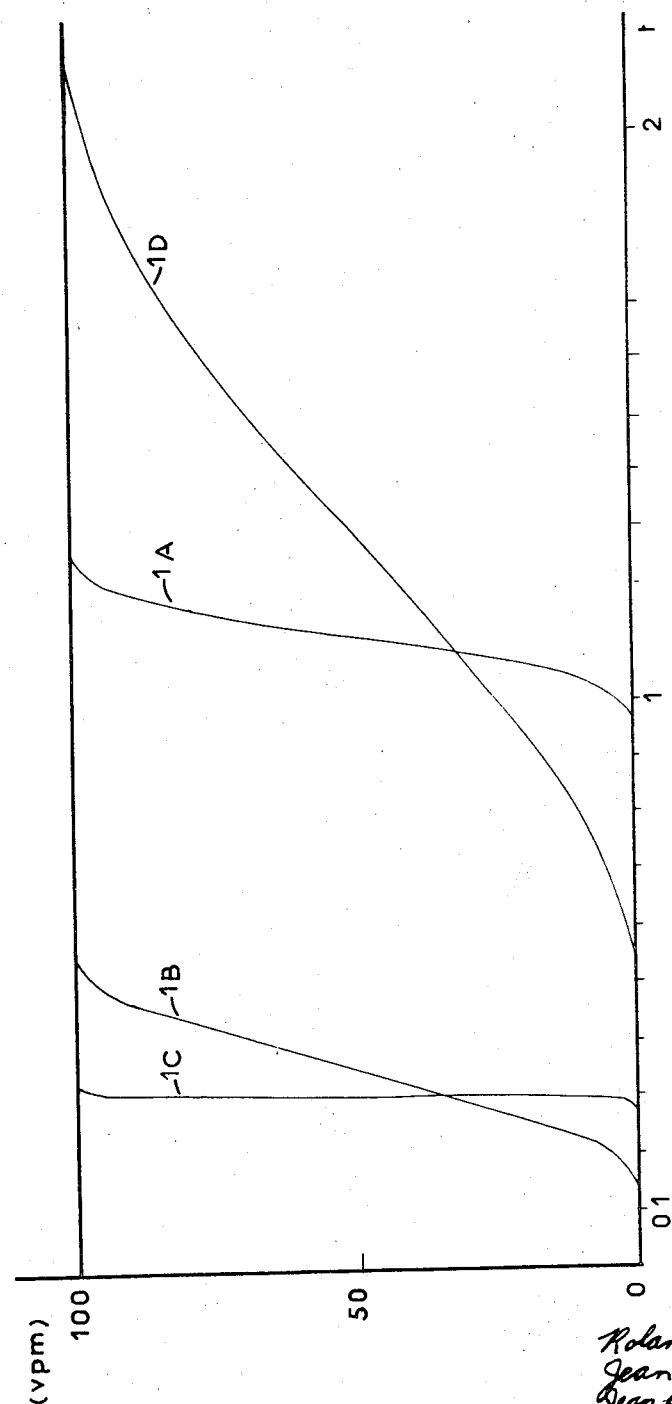

The present invention relates to an improved process for purifying gas mixtures not having an oxidising character under the conditions at which the purification takes place and particularly containing as impurity NO. It is also concerned with any installation for carrying out this process.

The present invention is more specifically concerned with a process for purifying $N_2O$, containing particularly NO as impurity. This invention also has for its object any installation and any adsorbent composition permitting this purification process to be carried out.

It is in fact known that $N_2O$ is preferably prepared by decomposition of ammonium nitrate at a temperature of the order of approximately 250° C. This decomposition reaction is very complex; in particular, $N_2O$ and water are formed, in accordance with the exothermic reaction:

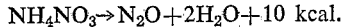

$$NH_4NO_3 \rightarrow N_2O + 2H_2O + 10 \text{ kcal.}$$

but there are also obtained, in small quantities, impurities such as NO, $NO_2 + N_2O_4$, $NH_3$, and also nitric acid and aerosols of nitrates. These impurities are present in extremely small proportions, which are smaller than 300 vpm. (parts volume per million), and they are all the more harmful as a certain number of them are unstable and can be easily transformed.

The purification is generally effected by successive washing operations after cooling and condensation. The washing operations generally consist of a washing with water, during which the $NO_2N_2O_4$, the ammonia and the nitrates are eliminated, followed by a washing with sodium hydroxide, which permits the residual NO to be eliminated, and a fresh washing operation with water, or neutralisation washing.

The NO is only stopped in small proportions by this series of washing operations; in order to facilitate the elimination thereof, the sodium hydroxide solution generally has added thereto a potassium permanganate solution which, by oxidation, permits the NO to be transformed into $NO_2$ and thus the elimination thereof "in situ."

These known purification processes, operating by successive washing operations, have numerous disadvantages. Not only do they not permit a perfect purification operation to be obtained but they also require high investment costs for initial materials and substances and necessitate installations of considerable size. The use of sodium hydroxide washing solutions also creates problems as regards the choice of the pumping systems. It is known to be possible to eliminate moisture with which the exiting gas is saturated, and also the traces of NO, $NO_2$ and $N_2O_4$ with which it is charged, by means of adsorption masses, generally aluminum oxide, disposed after the washing towers; however, because of the formation of acids, the effective life of the aluminum oxide is relatively short and the cost of the purification, already high, is further increased.

Attempts have been made for a long time to reduce the cost of these treatments of the $N_2O$ obtained by decomposition of $NH_4NO_3$; numerous tests have been carried out by means of molecular sieves and especially by means of natural or artificial zeolites. These tests have scarcely been conclusive.

Actually, the conventional molecular sieves do not permit of preferentially adsorbing NO in relation to $N_2O$, so that for completely eliminating NO, it is necessary simultaneously to drive off a large proportion of $N_2O$, and this reduces to a very considerable degree the production yield of $N_2O$; the purity of the $N_2O$ in addition still leaves much to be desired.

The researches which have led to the present invention have resulted in the surprising and absolutely unexpected discovery that it was possible, by means of certain molecular sieves, to obtain the elimination of the NO contained in the $N_2O$, and this at a low cost, without locking up capital or considerable investment costs, and without rapid degradation of the molecular sieves which are used. The regeneration treatments of the said sieves are extremely easy and the residual adsorption capacity, although slightly smaller than at the time of the first adsorption, is still constant after several cycles.

The present invention has for its object a process for purifying gas mixtures not having an oxidising character under the conditions in which the purification takes place and containing particularly as impurity NO, in which the gas mixture is brought into contact with an adsorbent mass formed of a molecular sieve, such as natural, artificial or synthetic zeolite, characterised in that the said sieve is charged with a metal in the metallic form.

Preferably, the said gas mixture is composed for the major part of $N_2O$.

These adsorbent masses are prepared according to known processes. One example of the preparation of such adsorbent masses consists in inserting a metal of a metallic salt in a zeolite and in effecting a reduction to the metallic state by hydrogenation at high temperature. This reduction has to be pushed to the maximum temperature, but below the temperature at which the crystalline structure is destroyed, and for a relatively long period.

It is obvious that numerous other methods of preparing these masses can be employed; these methods have to be adapted to each particular case. It is particularly necessary that the degree of acidity of the metallic salt being used does not alter or destroy the structure of the zeolite being employed. It is evident that it is necessary for there to be compatibility between the dimensions of the pores of the zeolite being employed and the dimensions of the metallic ions.

According to one way of carrying this purification process into effect, the zeolite is a zeolite which belongs to the group comprising the zeolites A, X, Y, D, L, R, S or T.

According to another way of carrying this purification process into effect, the zeolite is a natural zeolite.

The zeolite is preferably a mordenite.

According to yet another way of carrying out this purification process, the zeolite is a synthetic mordenite.

According to one form of this purification process, the metal is a metal belonging to the group of metals known as transition metals.

According to another embodiment of this purification process, the metal is a metal of the groups VIII–B or I–B.

According to yet another embodiment of this purification process, the metal is iron, cobalt, nickel or copper.

The contact between the gas mixture and the adsorbent mass preferably, but not necessarily, takes place at ambient temperature.

The regeneration of the adsorbent masses is effected by being brought under vacuum, and possibly by elution, preferably by means of a reducing gas, or a non-oxidising inert gas, or a mixture formed of reducing gas and/or non-oxidising inert gas. The regeneration of the adsorbent masses is effected by elution.

The temperature to which the adsorbent is brought, during the regeneration, is preferably higher than the adsorption temperature. A regeneration with a gas of oxidising character, such as air, is to be avoided; the very reactive nature of the metal in the metallic form may lead, in the presence of oxygen and at high temperature, to an oxidation of the metal, whereby the adsorbent mass loses its efficiency.

The adsorbent mass, made ineffective or less effective by total or partial oxidation of the metal which is present, can be restored to the intial state by a reduction.

The reduction of the adsorbent mass is generally effected at 350° C. However, it is possible, depending on circumstances, to operate at a lower temperature, for example at about 250° C., for a longer time. The gas used is preferably pure hydrogen. Nevertheless, it may be any reducing mixture, such as for example a mixture of inert gases containing 5% of hydrogen.

The present invention is also concerned with a process for purifying $N_2O$, containing various impurities, such as $NO$, $NO_2$, $N_2O_4$, $NH_3$, $H_2O$, etc., this process being characterised in that the gas mixture undergoes one or more preliminary treatments with a view to eliminating the impurities, such as $NO_2$, $N_2O_4$, $NH_3$, $H_2O$, etc., whereafter it is purified, particularly to remove traces of residual $NO$, by means of the aforesaid adsorbent mass, which is formed of a molecular sieve, such as natural, artificial or synthetic zeolite, charged with a metal in the metallic form.

According to one embodiment of this purification process, the preliminary treatment or treatments are particularly preceded by washing operations with water and possibly washing operations with sodium hydroxide solution.

According to yet another embodiment of this purification process, the said preliminary treatments consist, at least in part, of one or more passages over one or more conventional adsorption masses, preferably insensitive to the action of acid media and capable of being regenerated.

These adsorption masses are, for example, formed of a natural, artificial or synthetic zeolite, preferably of acid character.

According to one embodiment of this purification process, the regeneration of the different aforementioned masses is effected by means of several different gases.

The invention also has for its object any installation for carrying out the aforesaid purification and scrubbing processes.

The invention is also concerned with the adsorbent masses formed of molecular sieves, such as natural or artificial zeolites, charged with one or more metals in their metallic form, the said adsorbent masses being employed in the purification process according to the invention.

Other characteristic features of the present invention will become apparent reading the following description and from the accompanying drawings, given in a non-limiting manner, and showing embodiments of the present invention.

FIG. 1 represents a series of curves 1A, 1B, 1C and 1D giving, as a function of time, for different adsorbent masses, the NO content of a stream of $N_2O$, previously treated on the said masses charged with different metals. It is thus possible to judge the greater or lesser efficiency of the sieves as differently charged.

The analyses of NO and $NO_2$ of the gas to be purified and of the purified gas, after passing over the scrubbing mass, are effected by colorimetry, using a reagent having the following composition: 0.5 g. of sulphamide and 0.25 g. of N-naphthyl-ethylenediamnie dihydrochloride for 1 litre of $N/10$ $H_2SO_4$. The concentration of the NO is determined, after elimination of the $NO_2$, by transformation of the NO into $NO_2$ on an oxidant, followed by a bubbling in the reagent.

In the following Examples 1 to 4, the operation is carried out by passage of $N_2O$ containing 100 vpm. of NO in a microcolumn with a length of about 20 cm. and an internal diameter of 6 cm., 5 cc. of the said column being effectively filled with the adsorbent mass. This scrubbing mass is formed of a zeolite into which the metal ion of a metallic salt is inserted, for example, in accordance with the conventional methods; this metal ion is then reduced to the metallic state by hydrogenation at high temperature. This treatment with the hydrogen must be pushed to the maximum temperature, but to below the temperature at which the crystalline structure is destroyed, and over a fairly long period of time.

The $N_2O$ to be scrubbed circulates at 2 bars absolute at a rate of flow of 100 litres per hour at 18–19° C.

EXAMPLE 1

The adsorbent mass is composed of mordenite, into which is inserted iron in the ferric state by exchanges in baths with a ferric chloride solution. A reduction is then carried out, by means of a stream of hydrogen, at 300° C. for 2 hours.

This mass is composed of particles with a grain size between 0.5 and 0.63 mm.; it contains 2.0% by weight of iron.

The curve 1A gives the content of NO in the $N_2O$ at the outlet of the column after passing over the said adsorbent mass, as a function of time in hours. The times plotted on the abscissae are counted, after deducting the response time of the NO detector.

EXAMPLE 2

A nickel adsorbent mass is prepared. This mass is obtained by exchange operations in a column with forced circulation of nickel chloride over mordenite granules (the exchange rate is about 67%). The reduction is then carried out by means of a stream of hydrogen at 300° C. for 2 hours.

The grain sizes being used are between 0.5 and 0.63 mm.

The curve 1B gives the content of NO in the $N_2O$ at the outlet of the column after passing over the said adsorbent mass, as a function of time in hours. The times plotted on the abscissae are counted after deducting the response time of the NO detector.

EXAMPLE 3

A copper adsorbent mass is prepared by exchange in baths with cupric chloride on mordenite. (The exchange rate is about 75%.) The reduction is then carried out by means of a stream of hydrogen at 300° C. for 2 hours.

The grain size is not so fine as that of the above Examples 1 and 2.

The curve 1C gives the content of NO in the $N_2O$ after passage over the said adsorbent mass, as a function of time in hours. The times plotted on the abscissae are counted after deducting the response time of the NO detector.

EXAMPLE 4

A cobalt adsorbent mass is prepared, said mass containing about 2% of cobalt in its exchanged form.

The curve 1D gives the content of NO in the $N_2O$ after passing over the said adsorbent mass, as a function of the time in hours. The times plotted on the abscissae are counted after deducting the response time of the NO detector.

Set out in the following table are the release rates and saturation rates of the NO on the various zeolites which are used. By release rate is understood the quantity of fixed NO at the moment of the appearance of the front at the outlet of the column. It is expressed as weight of impurity per unit of volume of the adsorbent mass. Among other parameters, it depends on the length of the column; this rate has only a relative value and is given as a comparison value between those of tests carried out on a like installation.

By saturation rate is understood the quantity of NO fixed per unit of the adsorbent mass (volume or weight) in the zone where the impurity is in adsorption equilibrium with the initial concentration of the gas to be scrubbed. It is expressed here as grams of impurity per $dm.^3$ of (cubic decimeter) adsorbent mass.

| Zeolites: | Release rate, g./dm.$^3$ | Saturation rate, g./dm.$^3$ |
|---|---|---|
| Mordenite with nickel | 0.375 | 0.93 |
| Mordenite with copper | 0.72 | 0.80 |
| Mordenite with iron | 2,52 | 3 |
| Mordenite with cobalt | 1.27 | 3.47 |

The comparison of the curves 1A, 1B, 1C and 1D with one another makes it possible to judge the greater or lesser efficiency of the charged sieves for the scrubbing of the $N_2O$ according to the invention.

This efficiency depends simultaneously on the saturation rate and on the front volume. By adsorption front volume is understood the column volume in which is disposed the adsorbent front when running is established. This volume depends inter alia on the size of grain of the adsorbent, this grain size being very small in the examples given in the present specification. If the cobalt mordenite has the highest saturation rate, it has on the contrary a front volume more than 5 times higher than that of the mordenite with iron.

It is however necessary to remember that the saturation rate values depend on the quantity of metal with which the zeolite is charged. Thus, a mordenite with 3.3% by weight of iron fixes up to 5.6 g./cc. of NO. In a parallel manner the mordenite with cobalt can be obtained with about 4% by weight of deposited metal, that is to say, a percentage about double that of the tested sample.

It is apparent from the results obtained in the above Examples 1 to 4 that adsorbent masses consisting of zeolites charged with metallic metal are capable of efficiently purifying the $N_2O$ of NO.

Although the examples which are given are only concerned with zeolites charged with iron, cobalt, nickel and copper, excellent results have been obtained with other metals which particularly belong to the transition metal group.

It is obvious that the zeolite charged with metallic metal must be stored in the absence of any gas which has an oxidising character at the contact temperature.

EXAMPLE 5

As in Example 1, the operation is carried out on a new adsorbent mass formed of mordenite containing 2.0% by weight of iron, and a series of cycles is produced which consist in a scrubbing of a stream of $N_2O$ with 100 vpm. of NO, followed by a regeneration.

The values of the release rates, determined after certain cycles, are as follows:

| | |
|---|---|
| 1st | 2.8 |
| 8th | 2.8 |
| 14th | 2.7 |
| 17th | 2.76 |

The stability of the product is thus checked, this product having maintained its efficiency during repeated cycles.

In the following Examples 6 and 7, the operation is carried out in the installation of FIG. 2.

Ammonium nitrate $NH_4NO_3$ is decomposed by heat, at 250° C., in a reactor 1. The gases obtained are conveyed by a conduit 2 to a water washing column 3, and then through the conduit 4 to the sodium hydroxide washing column 5, thereafter leaving this last column through the conduit 6. The gases in the conduit 6 which may be returned to conduit 7 have approximately the following composition:

| | |
|---|---|
| $N_2O$ | Main constituent. |
| $H_2O$ | Saturation at ambient temperature. |
| $NO_2+N_2O_4$ | 12 to 25 vpm. |
| NO | 5 to 10 vpm. |
| $N_2$ | A few thousands of vpm. |
| $O_2$ | Possible traces. |

Alternatively, if it is not desired to wash with sodium hydroxide, branched off from the conduit 4, through the conduit 7, after having passed through the washing column 3, is a gas which has approximately the following composition:

| | |
|---|---|
| $N_2O$ | Main constituent. |
| $H_2O$ | Saturation at ambient temperature. |
| $NO_2+N_2O_4$ | 60 to 110 vpm. |
| NO | 30 to 55 vpm. |
| $N_2$ | A few thousands of vpm. |
| $O_2$ | Possible traces. |

This gas is in practice available at atmospheric pressure.

Figure 2:
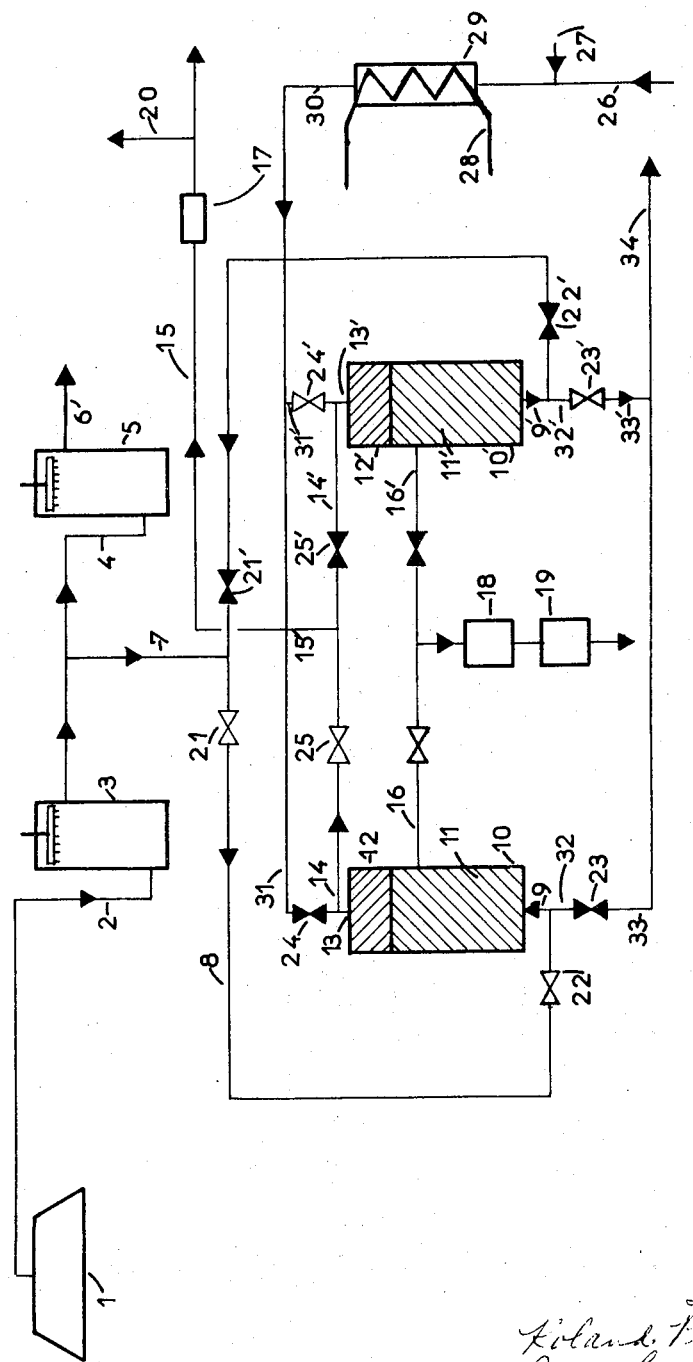

The installation shown in FIG. 2 comprises two columns 10 and 10′ operating alternately in an adsorption phase and a regeneration phase. The complete cycle which is provided is of 16 hours duration with reversal of the phases every 8 hours.

Each column, with a height of 120 cm., a diameter of 8 cm. and a volume of 6 dm.$^3$, consists of two beds 11–12 and 11′–12′.

(a) The beds 11 and 11′ contain 5 dm.$^3$ of acid mordenite with a grain size of 3 mm., at the inlet for the gas to be scrubbed.

(b) The beds 12 and 12′ of 1 dm.$^3$, over a height of 20 cm., contain mordenite charged with 2% of iron, of grain size 3 mm.

As is known, the acid mordenite bed is intended for stopping the water, $NO_2$ and $N_2O_4$. The iron-charged mordenite bed is used for adsorbing NO from the $N_2O$.

A branch pipe 16–16′ for analysis of the gas circulating through the columns is fixed at two-thirds of the acid mordenite bed. It makes it possible to detect essentially the appearance of the humidity front (in the humidity detecting cell 18) at this level in the column, and possibly the appearance of $NO_2$ or NO (by an apparatus not shown). 19 is a vacuum pump drawing off the gas through a capillary.

In the embodiment illustrated by way of example, the column 10 is functioning as an adsorption column and the column 10′ is functioning as a regeneration column.

Supplied through the conduit 7, the gas to be purified is brought to the column 10 through the conduits 8 and 9, the valves 21 and 22 being open and the valves 21′, 22′ and 23 closed.

Through the conduits 13, 14 and 15, the purified gas is drawn off by means of a compressor 17 (it is circulating substantially at atmospheric pressure, at ambient temperature and at a rate of 0.5 m.$^3$/h.) and is carried by the conduit 20 to an NO measuring device (not shown).

The valve 25 is open and the valve 25′ is closed.

Before commencing the tests, the adsorbent of each column is brought to 300 to 350° C. under a stream of hydrogen (supplied through the conduit 27) at a rate of about 9 m.$^3$/h. and for 8 hours. This operation permits of regenerating the acid mordenite and also the iron-charged mordenite, and of also reducing the iron contained in this latter to the metallic state.

The following regenerations occurring during the normal cycle, after an adsorption, are effected in counter-current with the adsorption by means of nitrogen, supplied through the conduit 26 at a rate of 9 m.³/h. The heating lasts 5 hours, the maximum temperatures reached at 320° C. at the inlet and 210° C. at the outlet of the column. The cooling time is 3 hours and the temperature reached after this time is about 35 to 40° C.

Before the regeneration gas is introduced into the column 10', it is heated in the exchanger 29 by means of a heating resistance 28 and then, through the conduits 30, 31', 13', the valve 24' being open and the valve 24 being closed, is supplied to the said column 10', which it leaves by way of the conduits 9', 32', 33' and 34, the valve 22' being closed and the valve 23' being open.

The adsorbent masses are caused to undergo a certain number of complete adsorption and regeneration cycles with the object of checking the efficiency of the two adsorbent beds with respect to the impurities which it is proposed to stop.

EXAMPLE 6

The adsorption of $H_2O$, $NO_2$, $N_2O_4$ and NO from the $N_2O$ was carried out for 10 cycles. At the 10th cycle, the normal duration of 8 hours was extended, with the object of obtaining the appearance of the NO front at the outlet of the column, of supervising a possible appearance of water or $NO_2$ at ⅔ of the acid mordenite adsorbent.

The adsorption conditions are as follows: ambient temperature 17° C. during the last 5 hours; rate of flow: about 0.535 m.³/h., measured under ambient pressure and temperature conditions. The test is continued for 25 hours.

The NO contents of the mixture to be purified, measured in the last hours of the cycle, are:

| | Vpm. |
|---|---|
| After adsorption for 19 hours | 54 |
| After adsorption for 20 hours | 51 |
| After adsorption for 21½ hours | 52.5 |
| After adsorption for 23 hours | 55 | i.e. an average content for the last 5 hours of 53 vpm.

It is established that no $NO_2$, $N_2O_4$ or $H_2O$ appears at ⅔ of the acid mordenite column.

At the outlet of the mordenite mass charged with metallic iron, it is established that the appearance of the NO front occurs at 17 hours 25 minutes. The NO content after 23 hours 50 minutes is 8.25 vpm.

EXAMPLE 7

At the 15th cycle, the operation is carried out as in Example 6, that is to say, the normal duration of the adsorption operation is lengthened with the object of carrying out the same measurements. The adsorption conditions are: ambient temperature: 19° C. during the last 8 hours; rate of flow: 0.480 m.³/h.; the test lasts 24 hours.

The NO contents at the inlet are:

| | Vpm. |
|---|---|
| After 17 hours | 33 |
| After 18½ hours | 41 |
| After 19½ hours | 41.5 |
| After 22½ hours | 56 |
| After 23½ hours | 48.5 | i.e. a mean content of 44 vpm. for the last 8 hours.

It is confirmed that no $NO_2$, $N_2O_4$ or $H_2O$ appears at ⅔ of the acid mordenite column. The appearance of the NO front at ⅔ of the acid mordenite column occurs after about 6 hours.

At the outlet from the mordenite mass charged with metallic iron, there is an appearance of the front after 20 hours 35 minutes. The NO content after 24 hours is 6.2 vpm.

By comparing Examples 6 and 7, it is established that the acid mordenite also stops the NO for a certain time; the quantities fixed are not very large, but are sufficient to delay for some hours the appearance of NO at the level of the iron-charged mordenite bed. The NO is moreover probably displaced progressively by $H_2O$ and $NO_2+N_2O_4$.

The iron-charged mordenite is found to be much more effective in stopping NO than the acid mordenite.

For Examples 6 and 7, under the working conditions as chosen, the volume of gas containing NO which is adsorbed on 1 dm.³ of iron-charged mordenite is of the order of 5 m.³.

Examples 6 and 7, carried out under rather similar conditions, give comparable volumes of completely purified gas; 9.3 m.³ and 9.9 m.³, respectively. The difference can be explained by the average content of NO in Example 7 being slightly smaller than that of Example 6. The iron-charged mass has practically maintained its full efficiency from the 10th to the 15th cycle.

The ratios between the volumes of acid mordenite and iron-charged mordenite, and also the grain sizes being used, can vary very considerably. In the case of Examples 6 and 7, in order to obtain $N_2O$, completely free from impurities, the ratio of the most suitable volumes would be a ratio of 2:1. It would also be preferable to use a smaller grain size than that of the tests, for exemple, 1.5 mm. instead of 3 mm., particularly for the iron-charged mordenite.

EXAMPLES 8 AND 9

Comparative examples carried out on mordenites respectively charged with 2% and 3.3% of iron show that the saturation rates obtained after reduction to hydrogen on the sample with 2% of iron are smaller than these same rates obtained on samples with 3.3% of iron.

This decrease is moreover very substantially proportional to the reduction in the iron percentage.

It is obvious that the invention is not limited to the embodiment which has been shown and that it is capable of numerous variations available to the person skilled in the art, depending on the proposed applications, without thereby departing from the scope of the invention.

Although the present specification has been limited to a relatively restricted number of examples, it is obvious that other metals than iron, cobalt, nickel and copper permit a metal-charged adsorbent mass to be obtained which has the property of holding back NO from a stream of gas. It is only for the sake of conciseness that the present specification has been limited to a fairly restricted number of examples.

What we claim is:

1. A process for purifying gas mixtures substantially composed of nitrous oxide $N_2O$ by removing nitric oxide NO contained therein as impurity, comprising bringing the gas mixture into contact with an adsorbent mass formed of a zeolite molecular sieve charged with a metal selected from the group consisting of transition metals of the groups VIII–B and I–B in the metallic form, whereby the nitric oxide is removed from the gas.

2. A process for purifying gas mixtures according to claim 1, wherein the zeolite is one selected from the group consisting of the zeolites A, X, Y, D, L, E, S and T.

3. A process for purifying gas mixtures according to claim 1, wherein the zeolite is a natural zeolite.

4. A process for purifying gas mixtures according to claim 1 wherein the zeolite is a mordenite.

5. A process for purifying gas mixtures according to claim 1, wherein the zeolite is a synthetic mordenite.

6. A process for purifying gas mixtures according to claim 1, wherein the metal is iron, copper, cobalt or nickel.

7. A process for purifying gas mixtures according to claim 1, wherein the contact between the gas mixture and the adsorbent mass occurs at ambient temperature.

8. A process for purifying gas mixtures according to claim 1, wherein regeneration of the adsobent mass is effected at a temperature which is higher than the purification temperature, is being brought under vacuum and by elution by means of a reducing gas.

9. A process for purifying gas mixtures according to claim 1, characterized in that the adsorbent mass made inefficient or less efficient by total or partial oxidation of the metal which is present, is restored to the initial state by a reduction.

10. Process for purifying nitrous oxide $N_2O$, containing various impurities including NO, $NO_2$, $N_2O_4$, $NH_3$, and $H_2O$, comprising eliminating the impurities $NO_2$, $N_2O_4$, $NH_3$, and $H_2O$, by means of at least one preliminary treatment and then purifying to remove traces of residual NO, by bringing the gas into contact with an adsorbent mass formed of a zeolite molecular sieve, charged with a metal selected from the group consisting of transition metals from the groups VIII-B and I-B in metallic form.

11. Purification process according to claim 10, wherein the preliminary treatment is particularly preceded by washing operations with water and washing operations with sodium hydroxide solution.

12. Purification process according to claim 10, wherein the preliminary treatment consists, at least in part, of washing operations with water and with sodium hydroxide solution.

13. Purification process according to claim 10, wherein the said preliminary treatment consists, at least in part, of at least several passages over at least one conventional adsorption mass, insensitive to the action of acid media and capable of being regenerated.

14. Purification process according to claim 13, wherein the aforesaid conventional adsorption mass is formed of a zeolite having an acid character.

15. Purification process according to claim 13, wherein regeneration of said adsorbent mass and of the said conventional adsorption mass is effected with like gases.

16. Purification process according to claim 13, wherein regeneration of said adsorbent mass and of said conventional adsorption mass is effected by means of several different gases.

17. A process for purifying gas mixtures according to claim 1, wherein regeneration of the adsorbent mass is effected at a temperature which is higher than the purification temperature, by being brought under vacuum and by elution by means of a non-oxidizing inert gas.

18. A process for purifying gas mixtures according to claim 1, wherein regeneration of the adsorbent mass is effected at a temperature which is higher than the purification temperature, by being brought under vacuum and by elution by means of a mixture formed of reducing gas and non-oxidizing inert gas.

References Cited

UNITED STATES PATENTS

| | | | |
|---|---|---|---|
| 1,919,842 | 7/1933 | Jean et al. | 23—3 L |
| 1,962,485 | 6/1934 | Dely | 23—3 L |
| 3,013,985 | 12/1961 | Breck et al. | 252—455 Z |
| 3,013,987 | 12/1961 | Castor et al. | 252—455 Z |
| 3,013,988 | 12/1961 | Bukata et al. | 252—455 Z |
| 3,084,023 | 4/1963 | Anderson et al. | 23—3 L |
| 3,015,369 | 1/1962 | Brennan | 55—75 X |
| 3,476,508 | 11/1969 | Kearby et al. | 23—2 E |
| 2,853,365 | 9/1958 | Barrer et al. | 23—157 |
| 3,393,047 | 7/1968 | Steinmetz-Schmaltz | 23—157 |

EARL C. THOMAS, Primary Examiner

U.S. Cl. X.R.

23—25; 423—402; 55—68, 75

UNITED STATES PATENT OFFICE
CERTIFICATE OF CORRECTION

Patent No. 3,689,212   Dated September 5, 1972

Inventor(s) R. Petit et al.

It is certified that error appears in the above-identified patent and that said Letters Patent are hereby corrected as shown below:

Column 3, after line 57, insert the following paragraph:

According to one embodiment of this purification process, the regeneration of the absorbent masses and the adsorption of masses is effected by a like gas.

Signed and sealed this 23rd day of January 1973.

(SEAL)
Attest:

EDWARD M. FLETCHER, JR.
Attesting Officer

ROBERT GOTTSCHALK
Commissioner of Patents